United States Patent
Steiss et al.

(10) Patent No.: US 6,895,493 B2
(45) Date of Patent: May 17, 2005

(54) SYSTEM AND METHOD FOR PROCESSING DATA IN AN INTEGRATED CIRCUIT ENVIRONMENT

(75) Inventors: Donald E. Steiss, Richardson, TX (US); Zheng Zhu, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 269 days.

(21) Appl. No.: 10/206,420

(22) Filed: Jul. 25, 2002

(65) Prior Publication Data

US 2004/0019764 A1 Jan. 29, 2004

(51) Int. Cl.[7] .............................................. G06F 12/00
(52) U.S. Cl. ....................... 711/216; 711/212; 711/155; 711/169; 711/158
(58) Field of Search ................................ 711/154, 155, 711/158, 169, 216, 202, 212, 109, 110

(56) References Cited

U.S. PATENT DOCUMENTS

| | | | | |
|---|---|---|---|---|
| 5,379,379 A | * | 1/1995 | Becker et al. ................. 711/3 |
| 5,948,081 A | * | 9/1999 | Foster .......................... 710/40 |
| 5,953,743 A | * | 9/1999 | Jeddeloh ...................... 711/158 |
| 6,415,340 B1 | * | 7/2002 | Ryan et al. ................... 710/52 |
| 6,651,148 B2 | * | 11/2003 | Widdup ....................... 711/158 |
| 2003/0110350 A1 | * | 6/2003 | McGee et al. .............. 711/108 |

* cited by examiner

Primary Examiner—Hong Kim
(74) Attorney, Agent, or Firm—Robert D. Marshall, Jr.; W. James Brady, III; Frederick J. Telecky, Jr.

(57) ABSTRACT

A method for processing data is provided that includes storing a write operation in a store buffer that indicates a first data element is to be written to a memory array element. The write operation includes a first address associated with a location in the memory array element to where the first data element is to be written. A read operation may be received at the store buffer, indicating that a second data element is to be read from the memory array element. The read operation includes a second address associated with a location in the memory array element from where the second data element is to be read. A hashing operation may be executed on the first and second addresses such that first and second hashed addresses are respectively produced. The hashed addresses are compared. If they match, the first data element is written to the memory array element before the read operation is executed.

18 Claims, 2 Drawing Sheets

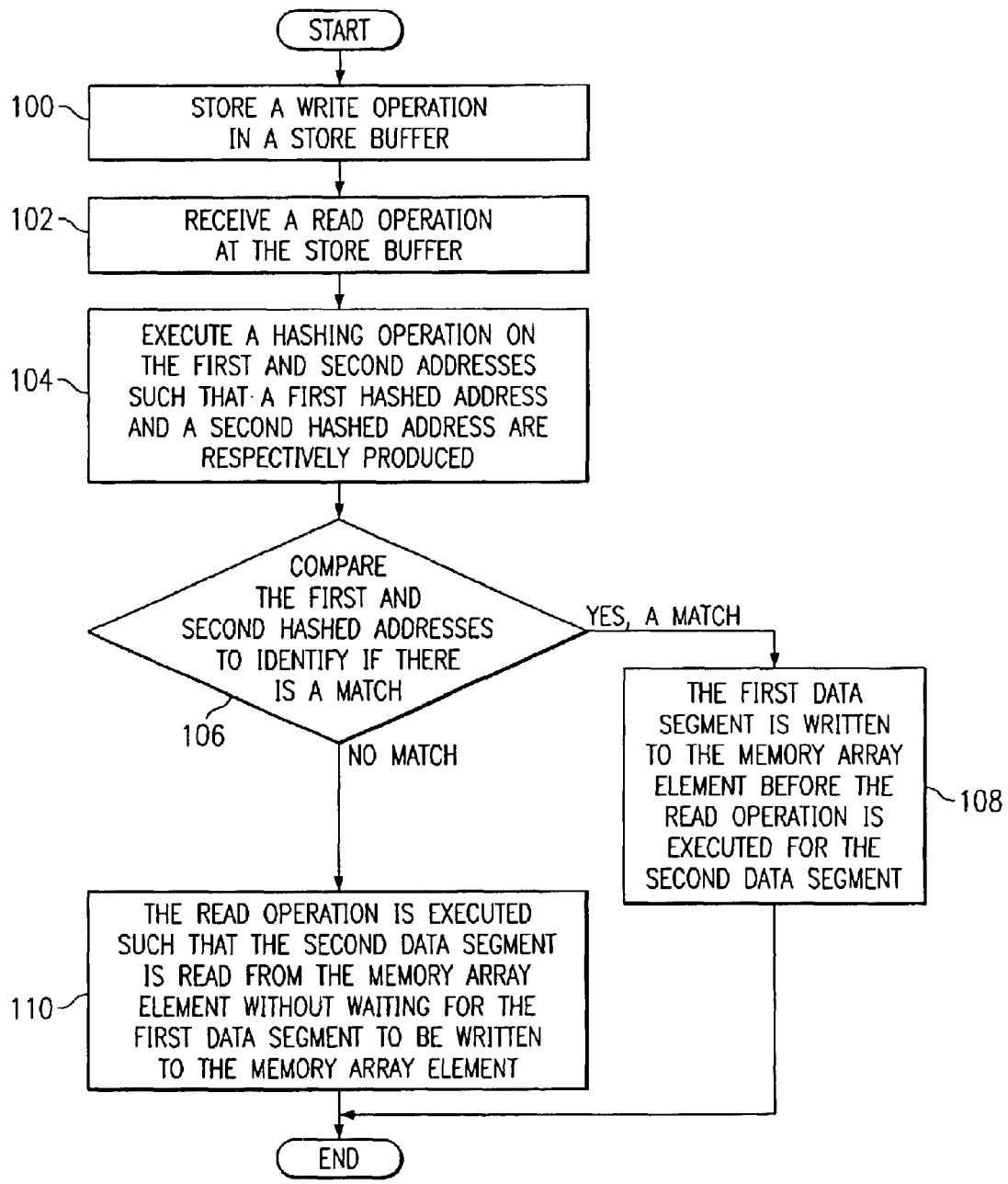

SYSTEM AND METHOD FOR PROCESSING DATA IN AN INTEGRATED CIRCUIT ENVIRONMENT

TECHNICAL FIELD OF THE INVENTION

This invention relates in general to the field of processing and more particularly to a system and method for processing data in an integrated circuit environment.

BACKGROUND OF THE INVENTION

Data processing has become increasingly important in integrated circuit and semiconductor environments. The ability to properly manipulate data as it is either written or read by a processor or a memory array element is important in achieving an efficient processing protocol. It may also be important to minimize power consumption during such processing operations in order to decrease power demands on an associated system and/or extend battery life. In addressing these and other processing issues, high processing speeds generally should not be sacrificed. As areas of processing technology such as error correction coding, encoding, and decoding have become more complex, it has become a significant challenge to maintain high processing speeds while concurrently consuming a minimal level of power.

Generally, a device, component, or element may include two processing speeds. A first processing speed may relate to the actual processor that executes a number of designated operations. A second processing speed may be associated with a memory array element that operates at a somewhat slower processing speed. This inequity in processing speeds may inhibit overall data processing performance. The ability to minimize this inequality in speed, without detracting from other processing concerns, represents one element that is important for effective processing operations.

SUMMARY OF THE INVENTION

From the foregoing, it may be appreciated by those skilled in the art that a need has arisen for an improved processing approach that provides the capability for devices or components to quickly process data in an integrated circuit environment. In accordance with one embodiment of the present invention, a system and method for processing data in an integrated circuit environment are provided that substantially eliminate or greatly reduce disadvantages and problems associated with conventional data processing techniques.

According to one embodiment of the present invention, there is provided a system for processing data that includes storing a write operation in a store buffer. The write operation indicates that a first data element is to be written to a memory array element. The write operation includes a first address associated with a location in the memory array element to where the first data element is to be written. A read operation may also be received at the store buffer. The read operation indicates that a second data element is to be read from the memory array element. The read operation includes a second address associated with a location in the memory array element from where the second data element is to be read. A hashing operation is executed on the first and second addresses at any suitable time interval such that a first hashed address and a second hashed address are respectively produced. The first and second hashed addresses are compared such that if they match each other the first data element is written to the memory array element before the read operation is executed for the second data element.

Certain embodiments of the present invention may provide a number of technical advantages. For example, according to one embodiment of the present invention, a processing approach is provided that allows for optimum processing speeds associated with a memory array element. This is a result of manipulations involving smaller address values derived from an address associated with a piece of data. These smaller address values may be used for subsequent processing comparisons with the data addresses residing in the store buffer. Thus, rather than execute a comparison that uses the entire address width of the data, a hashing function may be implemented such that only a portion of the address is needed to make an effective comparison.

This truncation of the address width provided by the hashing function may result in a reduction of power needed to make comparisons for incoming read operations with write operations that are stored in a store buffer. Additionally, such a comparison is quicker and thereby enhances processing speeds as only a derived portion of the original address is compared to an incoming address associated with a read operation. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3 is a flowchart illustrating a series of example steps associated with a method for processing data in an integrated circuit environment.

DETAILED DESCRIPTION OF THE INVENTION

Figure 1:
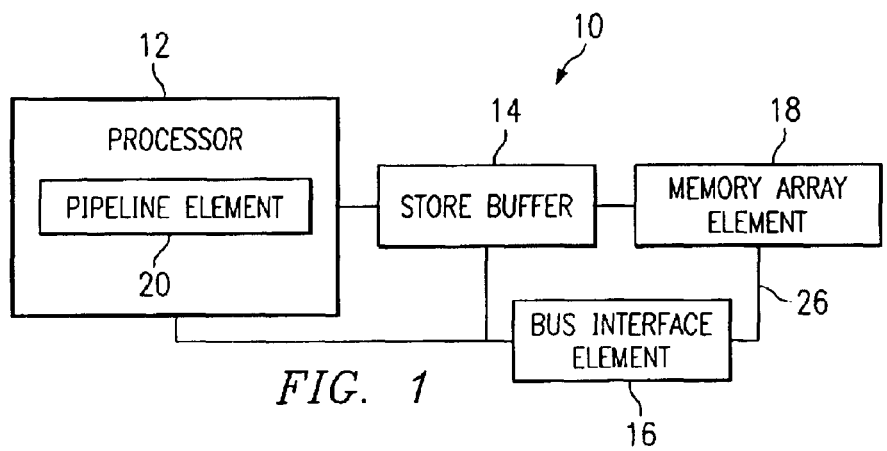
FIG. 1 is a simplified block diagram of a processing system for processing data in an integrated circuit environment.

FIG. 1 is a simplified block diagram of a processing system 10 for processing data in an integrated circuit environment. Processing system 10 includes a processor 12, a store buffer 14, a bus interface element 16, and a memory array element 18. Processor 12 may include a pipeline element 20 that operates to receive and/or manage, read or write operations to be communicated to store buffer 14. These elements may be included on a single integrated circuit chip or, alternatively, any one or more of these elements may be provided independent of or external to such an integrated circuit chip or included within any other suitable component, device, or element where appropriate.

Processing system 10 operates to process data flows such that information may propagate quickly through processing system 10 while consuming minimal power. This is achieved by executing a hashing operation on addresses associated with data or information that is to be written to or read from memory array element 18. Hashing an address associated with a piece of data provides a truncated address pattern that may reflect an identity associated with the data that relates to its intended destination. This pattern may then be compared to the hashed addresses that correspond to data or information that is held by store buffer 14 to be written to memory array element 18.

After an incoming address is hashed, a comparison may then be made between information that is designated to be written to memory array element 18 and information associated with incoming read operations. The hashed address produces a significantly smaller bit width and thus significantly reduces the complexity of such a comparison. In cases where there is a match between an incoming read address and an existing write address, store buffer 14 may be allowed to drain or finish the enqueued write operations before the incoming read operation is executed. Where there is not a match, the read operation may flow through from processor 12 to store buffer 14 and access the selected location of memory array element 18 in order to perform the designated read operation. This reflects a direct execution of the read operation without regard to the concurrent operations that may be performed by store buffer 14.

Processing system 10 provides for a significant reduction in power and resources by implementing a hashing function to be used on incoming addresses associated with read and write operations. The smaller hashed value, which is derived from the address of a piece of incoming data, is used for a comparison to determine whether memory array element 18 is prepared to provide an accurate data array for the incoming read operation. The truncation of the address width provided by the hashing function reduces the power needed to make comparisons for incoming read operations with write operations that are stored in store buffer 14. Additionally, the comparison is quicker (as contrasted with comparisons of entire address widths) because only a derived portion of the original address is compared to an incoming address associated with a read operation.

Processing system 10 also provides for the accurate dissemination of data or information sought to be accessed or read from memory array element 18. This is because subsequent access requests for addresses that match write operations that are currently active are effectively blocked. By blocking subsequent read operation requests, it is ensured that the most accurate data is being accessed or read from memory array element 18. This is in contrast to systems that allow concurrent access to an address that is already being occupied with a write operation. Such a write operation, in some scenarios, may change the data or information associated with a location in memory array element 18. This would improperly allow access to data holding questionable integrity. This scenario is effectively avoided in processing system 10.

Processor 12 is a programmable device with an instruction code that provides for the processing of data or information in an integrated circuit environment. Processor 12 is a digital signal processor in accordance with one embodiment of the present invention. However, processor 12 may alternatively be a microprocessor, a central processing unit (CPU), digital signal processor (DSP), or any other suitable processing element that processes data or information. In an alternative embodiment of the present invention, processor 12 may be a single element that includes store buffer 14 and memory array element 18 and that is coupled to bus interface element 16. Processor 12 may be provided directly on an integrated circuit or alternatively provided external to an integrated circuit or 'off-chip' where appropriate and according to particular needs.

Processor 12 may include pipeline element 20 (or may be externally coupled thereto), which is a piece of hardware that performs computations and operates to manage read and write operations. Pipeline element 20 may be coupled to store buffer 14 and/or bus interface element 16 and operate to exchange data between these elements. Alternatively, pipeline element 20 may be any suitable component, software, element, or object that communicates write and read operations to a suitable next destination. Pipeline element 20 may manage one or more incoming read operations such that store buffer 14 receives incoming data at a suitable rate. Pipeline element 20 may include a queue, cache, register, or any other suitable components or elements operable to facilitate the management or communication of read and write information. In an alternative embodiment of the present invention, pipeline element 20 may be deleted entirely, whereby processor 12 or any other element provided in processing system 10 may assume one or more of the management and communication responsibilities performed by pipeline element 20.

Store buffer 14 is a data management element that provides data access for information to processor 12. The use of the terminology 'store buffer' as used herein in this document may refer to similar data management elements such as write buffers, queues, or write registers for example. Store buffer 14 may include or be substituted by any such structures and additionally be any other suitable element, component, hardware, software, or object that provides data access for information to processor 12. Store buffer 14 stores read and write operations that may require access to memory array element 18. Store buffer 14 performs functions that allow processor 12 to continue operating while operations are executed in conjunction with memory array element 18 at potentially a slower speed. For example, processor 12 may be running at 1 Gigahertz rate, whereby memory array element 18 is only running at several hundred Megahertz. Accordingly, a discontinuity in the speeds of processing may be occurring that generally facilitates processor 12 storing information in store buffer 14 and then proceeding to the next operation without having to wait for operations to finish before moving to a next task.

Store buffer 14 is coupled to memory array element 18 and bus interface element 16 and includes a hashing function provided therein. Store buffer 14 allows any selected elements within processing system 10 to access data or information included therein and may additionally include algorithms or programs used for the movement of data into and out of store buffer 14. Store buffer 14 may include any suitable hardware, software, object, or element that provides a holding location for data or information propagating through processing system 10.

Bus interface element 16 is a communications interface that may cooperate with store buffer 14 in reading and writing data to and from memory array element 18. Bus interface element 16 communicates information or data over a processor data bus 26, which represents a pathway for the transfer of information. Bus interface element 16 may respond to signals or requests from processor 12, store buffer 14, or memory array element 18 and may further execute requests or commands based on such incoming signals. Bus interface element 16 may remove or access data from memory array element 18 using a first in first out (FIFO) communications protocol. Alternatively, bus interface element 18 may use any other suitable protocol in order to access, read, or write information to and from memory array element 18.

Memory array element 18 is a data storage unit that stores information to be accessed by store buffer 14 and/or bus interface element 16. Memory array element 18 may include data elements to be read by store buffer 14 acting in cooperation with processor 12. In addition, memory array element 18 may include data elements to be written therefrom (or thereto) based on instructions from store buffer 14, potentially via processor 12. Alternatively, memory array element 18 may store any other suitable data or information related to the processing of data in processing system 10. Memory array element 18 may be any random access memory (RAM), read only memory (ROM), static random access memory (SRAM), field programmable gate array (FPGA), erasable programmable read only memory (EPROM), electrically erasable programmable read only memory (EEPROM), application-specific integrated circuit (ASIC), microcontroller, or microprocessor element, device, component or object that operates to store data or information in an integrated circuit environment. Memory array element 18 may include any suitable hardware, software, or program that organizes and selects data to be communicated from memory array element 18 to any suitable next destination.

Figure 2:
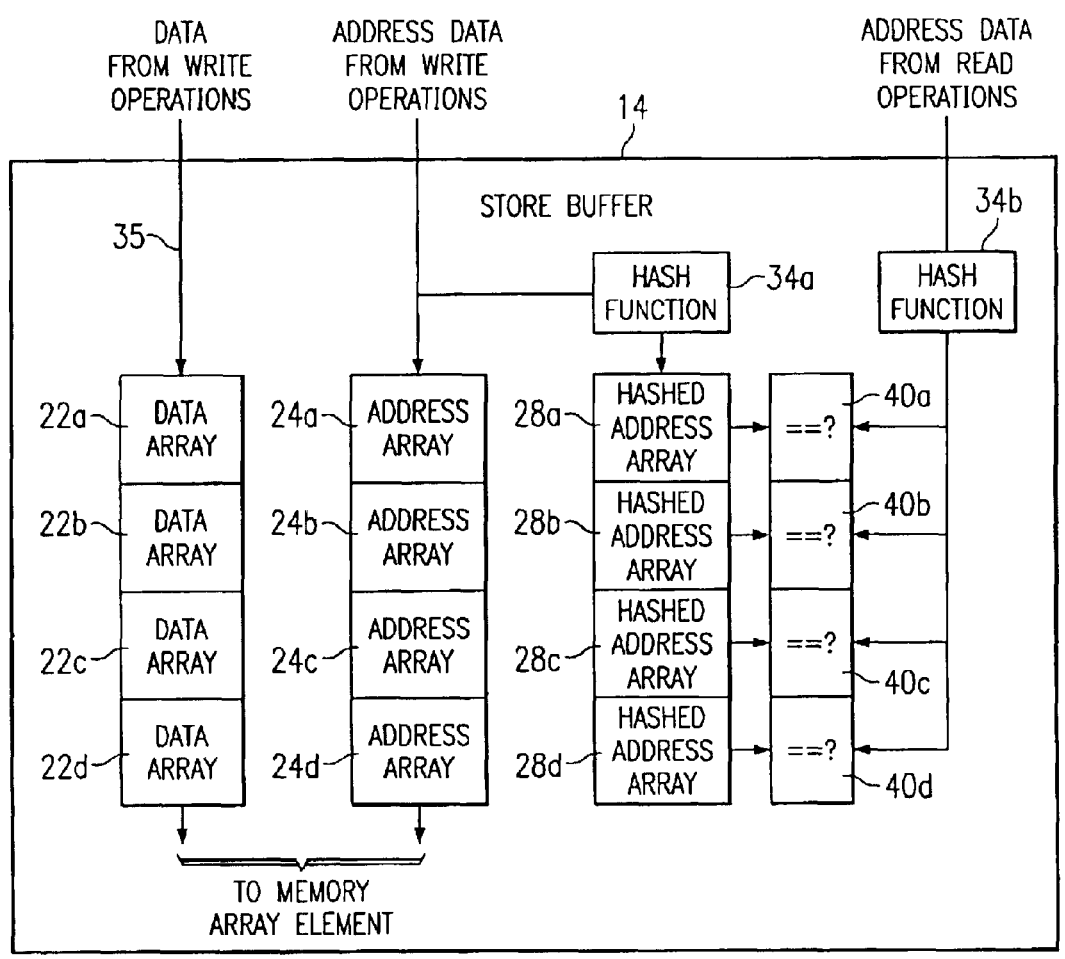
FIG. 2 is a simplified block diagram of a store buffer that is included within the processing system.

FIG. 2 is a simplified block diagram of store buffer 14 in accordance with one embodiment of the present invention. Store buffer 14 includes multiple data arrays 22a–22d, multiple address arrays 24a–24d, multiple hashed address arrays 28a–28d, and a set of hash functions 34a and 34b. Additionally, FIG. 2 illustrates a series of write operations 38 from processor 12 and a series of hashed read address outputs 40a–40d.

Data arrays 22a–22d each represent a data element associated with a write operation being executed in conjunction with memory array element 18. Data arrays 22a–22d are pieces of information that are to be written to a specific location in memory array element 18 as instructed by processor 12. Each data array 22a–22d includes a selected one of address arrays 24a–24d. Each address array 24a–24d represents a location in memory array element 18 to which a corresponding data array 22a–22d is to be written to. Each of data arrays 22a–22d and each of address arrays 24a–24d may be any suitable bit length or width such that an address in memory array element 18 may be determined from the information.

Each of address arrays 24a–24d may be communicated through hash function 34a or accessed by hash function 34a such that a result is produced reflected by hashed address arrays 28a–28d. Hashed address arrays 28a–28d represent the truncation of address arrays 24a–24d and are significantly smaller than their original form. This truncation enhances processing speeds because the comparisons between addresses is significantly less complex. For purposes of teaching it is helpful to explain the hashing operations performed by each of hash functions 34a and 34b.

Hash functions 34a and 34b may each execute a process whereby an incoming read or write operation is divided into its data element portion and its address portion. The address portion may then be transformed such that a smaller representation of the original address portion is generated. Thus, comparisons for read operations may be made on a smaller bit-basis, which reduces power and is generally quicker. Hash functions 34a and 34b ensure that each time an identical address pattern is encountered, the same output hashing pattern will be produced. Hashing represents a way of performing optimal searches and retrievals. It may increase speed, ease data transfer, improve retrieval time and efficiency, and optimize searching of data.

A number of hashing methods may be employed by hash functions 34a and 34b such as a division method, a multi-plication method, a folding method, a length-dependent method, a mid-square method, a digit-analysis method, or an addition method. Simple parity executions may also be employed to provide a hashing element to processing system 10. Parity represents a form of hashing or error checking that may be used in numerous communications environments. There are generally four types of parity-even, odd, marked, and spaced. For even and odd parity, the parity bit (the last bit after the data bits) may be set to a value to ensure that the transmission has an even or odd number of logic-high bits. For example, if the data is 011, then the parity bit is 0 for even parity to keep the number of logic high bits even. If the parity is odd, then the parity bit is 1 resulting in 3 logic-high bits. Marked and spaced parity generally does not actually check the data bits, but simply sets the parity bit high for marked parity or low for spaced parity.

Each of hashing functions 34a and 34b may produce a hashed result to be subsequently compared to other hashed results. Hash function 34a produces hashed address arrays 28a–28d. Hash function 34b produces hashed read address outputs 40a–40d. A comparison may then be made between the incoming hashed address arrays and the existing hashed address arrays associated with write operations such that in cases where there is a match, store buffer 14 may be allowed to drain to memory array element 18 before any read operation is executed.

In operation of an example embodiment, a 32 bit address associated with a read or a write operation may be communicated through processing system 10 and to store buffer 14. A read or a write operation may be suspended or delayed if the designated location in memory array element 18 is in use. For purposes of example, store buffer 14 may represent an element that is 8 bytes wide. Processor 12 may include an adder that may take in two register values from a general purpose register and an immediate value for an offset to compute a given memory address. The output of pipeline element 20 may supply the read addresses and the write data with corresponding write addresses to store buffer 14. When a read or write operation is received by store buffer 14, the read or write operation may be enqueued in store buffer 14. Generally, bus interface element 16 (on the output side of store buffer 14) may remove elements from store buffer 14 in any suitable protocol. One example of a suitable protocol is a FIFO order. Bus interface element 16 may then write those values to memory array element 18.

Thus in the example embodiment provided, 29 bits of information are incoming to store buffer 14, whereby that information is divided into one group of four bits and five groups of five bits. A hashing operation may then be executed by hash functions 34a or 34b. For example, the parity may be taken of the incoming data by X-ORing those address bits together. This generates a 6-bit hashed value. The hashed value may then be enqueued in store buffer 14 with the requisite address information, which is necessary for reading or writing the data from or to memory array element 18.

On subsequent read operations as illustrated in FIG. 2, a hash function may be executed on incoming addresses associated with the read operations. A comparison may then be executed between all hash function outputs in store buffer 14 associated with write operations and the result of the computation associated with the incoming read operation. Where there is a match in hashed values, processor 12 may wait for all values in store buffer 14 to be written out to memory array element 18. After this draining is performed, the read operation may then be executed.

In the event where none of the values match the hashed value that was computed for the incoming read address, the read operation may retrieve the targeted data value from memory array element 18 without regard to what operation store buffer 14 may be concurrently performing. This blocking of information in cases where a data element is being occupied by a write operation ensures the accurate dissemination of data or information sought to be accessed or read from memory array element 18. This is because subsequent access requests for addresses that match the incoming addresses for read operations are suspended or temporarily prohibited. Thus, only the most accurate data is being accessed or read from memory array element 18. This is in contrast to systems that allow access to an address that is already being occupied with a write operation. Such a write operation in some scenarios may change the data or information associated with a location in memory array element 18. This improperly allows access to data having questionable integrity.

In order to reduce the number of ghosts or false hits where the computed hashed result matches another hashed result but is not associated with the same memory location, a hashing algorithm or mechanism may be provided that is sufficiently detailed such that the potential for receiving false hits is unlikely. In cases where a ghost or false hit is generated, it may be treated just as though there was an address match. This does not inhibit system speed nor detract from the power benefits of the present invention. Thus, it is generally irrelevant in cases where ghosts or false hits occur because the read operation will return the same value for false hits from store buffer 14. These results still reflect accurate data being retrieved from memory array element 18.

FIG. 3 is a flowchart illustrating a series of steps for processing data in an integrated circuit environment. The method begins at step 100 where a write operation is received by store buffer 14 and stored therein. The write buffer may include an address array, a data array, and a hashed address array. The address array is used to hold addresses for the eventual write operation in the memory system. The hashed address array holds addresses generated by hash function 34a. The hashed element may identify an associated destination in a smaller format. At step 104, hash function 34a and hash function 34b may generate hashed address array 28a corresponding to data array 22a and a write operation and hashed read address output 40a corresponding to an address array provided by an incoming read operation respectively.

At step 106, hashed address array 28a and the hashed read address output 40a may be compared in order to verify that there is not a match between the two elements. Additionally, a series of comparisons may be executed whereby all of the hashed address arrays 28a–28d and all of the hashed read address output 40a–40d are compared to each other in order to ensure no matches are present. Where matches are present, store buffer 14 may be allowed to drain or perform one or more write operations at step 108 before the read operation is executed. This would allow a selected one of data arrays 22a–22d to be written to memory array element 18 before a read operation is executed that corresponds to the same address as the write operation.

Where no matches are found, at step 110 the read operation may be executed without regard to the concurrent or pending operations of store buffer 14. Thus store buffer 14 would not need to drain before the read operation is executed directly. Some of the steps illustrated in FIG. 3 may be changed or deleted where appropriate and additional steps may also be added to the flowchart. These changes may be based on specific processing systems or architectures, or particular store buffer 14 arrangements or configurations, and do not depart from the scope or the teachings of the present invention. For example, incoming addresses associated with write or read operations may be hashed at any suitable interval. Write operations may include corresponding address arrays that are hashed immediately after being received by store buffer 14 or, alternatively, hashed after a read operation is received by store buffer 14 that triggers a hashing function. Hashing operations may additionally be performed at any other suitable time interval where appropriate and according to particular needs.

Although the present invention has been described in detail with reference to particular embodiments, it should be understood that various other changes, substitutions, and alterations may be made hereto without departing from the spirit and scope of the present invention. For example, although the present invention has been described as operating in an integrated circuit environment, the present invention may be used in conjunction with any suitable chip, processing unit, or processing element that seeks to read or write data. In addition, all of the elements illustrated in FIG. 1 may be included on a single chip where appropriate. Explanations provided above with reference to an integrated circuit environment are only offered for purposes of example and teaching and should not be construed to limit the scope of the present invention in any way.

In addition, the arrangement as illustrated in FIGS. 1 and 2 is somewhat arbitrary in that any combination of these elements may be effectuated without departing from the scope of the present invention. For example, one or more of the elements illustrated in FIG. 1 may be included within processor 12 where appropriate. In addition, one or more of the elements within FIG. 1 may be included within another element operating in accordance with the teachings of processing system 10 in order to read and write data in any data communications environment. Moreover, many of the elements illustrated in FIG. 2 may similarly be combined where appropriate. For example, hash functions 34a and 34b may be combined into one hashing unit such that write operations and read operations received by store buffer 14 may be used to generate hashed result outputs to be compared. Additionally, numerous other elements such as caches, interfacing units, registers, and other processing elements may be included within FIG. 1 or FIG. 2 in order to facilitate the processing of data or information within processing system 10.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

Moreover, the present invention is not intended to be limited in any way by any statement in the specification that is not otherwise reflected in the appended claims. Various example embodiments have been shown and described, but the present invention is not limited to the embodiments offered. Accordingly, the scope of the present invention is intended to be limited solely by the scope of the claims that follow.

What is claimed is:

1. A method for processing data, comprising:

storing a write operation, the write operation indicating that a first data element is to be written, the write operation including a first address associated with a location to where the first data element is to be written;

executing a hashing operation on the first address such that a first hashed address is produced, the hashing operation transforming bits of the address into a smaller representation of the address;

receiving a read operation, the read operation indicating that a second data element is to be read, the read operation including a second address associated with a location from where the second data element, is to be read;

executing the hashing operation on the second address such that a second hashed address is produced;

comparing the first and second hashed addresses;

writing the first data element before the read operation is executed for the second data element in response to the first hashed address matching the second hashed address; and reading the second data element without waiting for the first data element to be written in response to the first hashed address not matching the second hashed address.

2. The method of claim 1, wherein the hashing operation is executed by taking the parity of one or more address segments associated with the first and second addresses.

3. The method of claim 1, wherein:
said hashing operation is executed according to a division method.

4. The method of claim 1, wherein:
said hashing operation is executed according to a multiplication method.

5. The method of claim 1, wherein:
said hashing operation is executed according to a folding method.

6. The method of claim 1, wherein:
said bashing operation is executed according to a length-dependent method.

7. The method of claim 1, wherein:
said hashing operation is executed according to a mid-square method.

8. The method of claim 1, wherein:
said hashing operation is executed according to a digit-analysis method.

9. The method of claim 1, wherein:
said hashing operation is executed according to an addition method.

10. An apparatus for processing data, comprising:
a processor operable to generate a write operation including write data and a write address and further operable to generate a read operation including a read address;

a memory array element operable to store a plurality of data elements at corresponding addresses; and a store buffer connected to said processor and said memory array element, said store buffer including
  a first hash function unit operable to receive a write address of a write operation and perform a hash operation to transform said write address into a writs hash address which is a smaller representation of the write address,
  at least one buffer entry including a data array operable to receive store write data of a write operation a corresponding address array operable to receive and store a corresponding write address of said write operation and a corresponding hash address array operable to receive and store a corresponding write hash address, said at least one buffer entry operable to transmit said write data to said memory array element for storage at said write according address to a predetermined protocol,
  a second hash function unit operable to receive a read address of a read operation and perform said hash operation to transform said read address into a read hash address which is a smaller representation of the read address said transform of said second hash function unit identical to said transform of said first hash function unit,
  a comparator corresponding to each at least one buffer entry for comparing a corresponding write hash address stored in said hash address array with said read hash address and indicating whether said read hash address matches said corresponding write hash address, and
  wherein said store buffer is operable to write said write data to the memory array element according to the write operation before said read operation is executed in response to said read hash address matching said write hash address; and
  wherein said store buffer is operable to read data from the memory array element according to the read operation without waiting for execution of any write operation in response to said read hash address not matching any write hash address.

11. The apparatus of claim 10, wherein said first hash function unit and said second hash function unit each performs the hashing operation by taking the parity of one or more address segments associated with the first and second addresses.

12. The apparatus of claim 10, wherein:
said first hash function unit and said second hash function unit each performs said hash operation according to a division method.

13. The apparatus of claim 10, wherein:
said first hash function unit and said second hash function unit each performs said hash operation according to a multiplication method.

14. The apparatus of claim 10, wherein:
said first hash function unit and said second hash function unit each performs said hash operation according to a folding method.

15. The apparatus of claim 10, wherein:
said first hash function unit and said second hash function unit each performs said hash operation according to a length-dependent method.

16. The apparatus of claim 10, wherein:
said first hash function unit and said second hash function unit each performs said hash operation according to a mid-square method.

17. The apparatus of claim 10, wherein:
said first hash function unit and said second hash function unit each performs said hash operation according to a digit-analysis method.

18. The apparatus of claim 10, wherein:
said first hash function unit and said second hash function unit each performs said hash operation according to an addition method.

* * * * *